United States Patent [19]

Garcia et al.

[11] Patent Number: 4,632,945
[45] Date of Patent: Dec. 30, 1986

[54] ANAEROBIC SEALANT UNAFFECTED BY WATER CONTAMINATION

[75] Inventors: Maria L. Garcia, Newington; Bernard M. Malofsky, Bloomfield, both of Conn.

[73] Assignee: Loctite Corporation, Newington, Conn.

[21] Appl. No.: 740,142

[22] Filed: May 31, 1985

[51] Int. Cl.$^4$ .................................................. C09J 3/14
[52] U.S. Cl. .................................... 523/176; 427/295; 523/169; 523/177
[58] Field of Search ............... 524/168, 176, 398, 560; 523/169, 176, 177; 428/272, 267, 395; 525/330.4; 427/295

[56] References Cited

U.S. PATENT DOCUMENTS

| 3,672,942 | 6/1972 | Neumann et al. | 427/295 |
| 3,855,040 | 12/1974 | Malofsky | 523/176 |
| 3,969,552 | 7/1976 | Malofsky et al. | 427/295 |
| 4,069,378 | 1/1978 | De Marco | 526/212 |
| 4,165,400 | 8/1979 | De Marco | 427/295 |
| 4,513,127 | 4/1985 | Jacobine | 523/176 |

Primary Examiner—Veronica P. Hoke
Attorney, Agent, or Firm—Walter J. Steinkraus; Eugene F. Miller

[57] ABSTRACT

An anaerobic sealant material comprises an acrylate or methacrylate monomer, a hydroperoxide or pereseter initiator, an accelerator having —SO$_2$NHCO-functionality, and a transition metal co-accelerator gives substantially reduced moisture sensitivity if the transition metal co-accelerator is a combination of a copper salt or complex at the level of 0.5–10 ppm copper and an iron complex or salt at the level of 0.5–60 ppm iron.

14 Claims, No Drawings

ANAEROBIC SEALANT UNAFFECTED BY WATER CONTAMINATION

BACKGROUND OF THE INVENTION

Composite articles manufactured from fiber reinforced thermoset resins frequently have some degree of porosity. Low to moderate performance composites with high resin to fiber ratios (e.g. 50% or more resin), such as sheet molding compounds will cure with small bubbles entrained throughout the article. Because cured resin surrounds these bubbles in the interior of the matrix, they usually do not cause performance problems. However, at the surface the bubbles are exposed. In industries such as automobile manufacture, articles formulated from sheet molding compound are frequently used in areas where they must be painted. This can be very difficult because surface porosities can blow unsightly holes in the paint finish during a paint bake cycle.

Much higher performance composite articles, such as wound fiber reinforced piping or pressure vessels for high pressure gas or chemicals, engines for solid fuel rockets and military hardware or ammunition, utilize very high fiber contents (typically as much as 85%). In such low resin content articles, the presence of porosity may provide significant leak paths for gases or liquids, especially corrosive hot gases such as those provided by an ignited rocket engine. The consequence of a leak during use of such articles can, of course, be catastrophic. It is therefore been proposed to seal porosities in cured fiber reinforced composite materials with an anerobic curing impregnant. Such impregnants are frequently used to seal porous metal parts such as metal castings and sintered metal articles. Descriptions of such impregnants may be found in U.S. Pat. Nos. 3,672,942; 3,969,552; 4,069,378 and EP No. 0101367.

In the impregnation of metal parts, the anaerobic sealant will usually contain a copper salt or complex at a level in excess of 1 ppm, typically 3–10 ppm as an accelerator of anaerobic cure. Copper at these levels in conjunction with the hydroperoxide catalyst and, usually, a saccharin coaccelerator, will give the sealant an unaerated pot-life, at ambient temperatures, of about 3 minutes to about an hour, which is usually sufficient to permit a vacuum or pressure cycle to force the sealant into the porosities of the article to be completed and aeration resumed before the pot begins to gel.

In commercial impregnation processes for small metal parts and the like, however, it is often the case that substantial quantities of moisture will be introduced into the sealant vat. This may come from condensation when refrigerated tanks are opened to air on humid days, from parts baskets which have been dipped in aqueous rinse baths, etc. It has been found that typical anaerobic impregnants which include copper salt accelerators can be severely inhibited by water. Although the repeated vacuum cycles to which an impregnation bath is subjected will help to get rid of water contamination, it would be desireable to have an anaerobic acceleration system which is less sensitive to moisture since use levels vary and less frequently evacuated baths may accumulate high moistures of wet level between uses. Also, if pressure rather than vacuum is used in the impregnation process there is no mechanism for removing water.

Furthermore, when composite materials are impregnated, it is often more difficult to force the sealant into the article and consequently a longer pot life sealant is desirable. Also, depending on the article, it may be desirable to minimize catalyst levels so as to avoid undesirable reactions due to residual oxidizing catalyst in the composite. However, when copper content is dropped below the 1 ppm level, it has been found that the cure sensitivity to moisture becomes critical. Any significant moisture content can prevent curing altogether even in the microscopic porosities of the impregnated article.

It has been found that many composite articles have a tendency to absorb substantial quantities of moisture (as much as several weight %) from the atmosphere. This is believed to be due to the presence of hydrophilic groups, such as hydroxyl, amine or amide in the cured resin (typically polyepoxides or polyamides), or in reinforcing fibers such as Kevlar ®.

Accordingly, there is a need for an anaerobic sealant which will reliably cure upon deprivation of oxygen even in the presence of moisture. In particular, it is desireable that such a sealant be capable of curing in the microscopic porosities of a thermoset resin/fiber composite article at or near ambient temperatures and have a copper content below ~1 ppm.

SUMMARY OF THE INVENTION

The present invention pertains to a novel anaerobic sealant material comprising an acrylate or methacrylate monomer, a hydroperoxide or perester initiator, an accelerator having —$SO_2NHCO$— functionality, and a transition metal coaccelerator, wherein the transition metal coaccelerator comprises: a copper salt or complex at the level of 0.1–10 ppm copper, preferably 0.4–1.0 ppm copper, based on composition weight; and an iron salt or complex at the level of 0.5–60 ppm Fe, based on composition weight, preferably 10–20 ppm Fe.

The inventive sealants display greatly reduced sensitivity to water and while maintaining the long term stability with aeration.

DETAILED DESCRITPTION OF THE INVENTION

Generally, the anaerobic sealant compositions of the invention contain monoacrylic and di- or polyacrylic monomers (that is acrylate and/or methacrylate functional compounds); peroxy initiators, typically hydroperoxide or perester compounds; accelerators such as saccharin or other compounds with —$SO_2NHCO$— functionality such as described in U.S. Pat. No. 4,513,127; and a source of transition metal ions. Free radical stabilizers are also typically included. Such compositions are well known in the art and are described in detail in the previously mentioned U.S. Pat. Nos. 3,672,942 and 3,969,552. Suitably the compositions may also employ surfactants or surfactant monomers such as described in U.S. Pat. No. 4,069,378 and EP No. 0101267.

The distinctive feature of the inventive compositions is that the composition includes both source of copper ion, in an amount equivalent to 0.1–10 ppm Cu, and a source of iron, which may be present as ionic iron or as a ferrocenyl compound, in an amount equivalent to 0.5–60 ppm iron. Preferably the iron compound is present as ferrocene in the range of 10–20 ppm iron and the copper is present at a level of 0.4–1.0 ppm. Also, it has generally been observed that the amount of copper should be less in parts by weight than the amount or iron. Preferably the iron is present at a level 2–30 times that of the copper.

This novel combination of iron and copper gives an anaerobic sealant which is uniquely storage stable and insensitive to moisture content. The sealant is especially suitable for sealing composite materials, especially porous high performance composites. The sealant is also advantageously employed in other impregnation processes susceptable to contamination of the sealant with water.

The invention is illustrated by the following non-limiting examples.

EXAMPLE 1

An impregnant formulation was made up as follows:
Triethylene glycol dimethacrylate 70.1%
Lauryl methacrylate 25.96%
Cumene hydroperoxide 1.0%
Dyes and surfactants 2.6%
Stabilizer solution* 0.4%
Saccharin 0.3%

*5% benzoquinone and 0.5% 1,2-bis(6-methyl-2'-pyridylmethyleneamino)-ethane in polyethylene glycol dimethacrylate.

To the formulation was added the levels of copper ion and iron shown in Table I as solutions in trichloroethane of copper ethylhexanoate (0.2% Cu) and ferrocene (1.0% Fe), respectively. These compositions were aerated for one hour and then gel times determined at 50° C. in glass test tubes (10×75 mm). The results demonstrate that iron at levels which give gel times comparable to a 0.6 ppm copper catalyzed system is not a practical system because of the instability of the composition with aeration.

TABLE I

| | Cu (ppm) | Fe (ppm) | Gel Time (min) | Comments |
|---|---|---|---|---|
| Control | 0.6 | — | 23 | Stable Indefinately With Aeration |
| A | — | 30 | >48 hrs. | — |
| B | — | 90 | " | — |
| C | — | 300 | — | Set up before gel time taken |
| D | — | 630 | 120 min. | — |
| E | — | 840 | 22 | Set up in 3 hrs. with aeration |

EXAMPLE 2

To the sealant formulation of Example 1 was added copper and iron solutions as in the previous example, equivalent to 0.6 ppm copper and 15 ppm iron. This composition was designated composition F. A control composition using just 0.6 ppm copper was also prepared. The compositions were aerated 1 hour and then water added as indicated in Table II. Gel times were determined at 60° C. The results which are set forth in Table II demonstrate that the combination of iron and copper gives much reduced moisture sensitivity while maintaining the desired dry gel times of the copper accelerated systems. Both compositions are stable for many months with aeration.

TABLE II

| | Cu (ppm) | Fe (ppm) | 60° Gel Times (min) % Added Water | | | | | |
|---|---|---|---|---|---|---|---|---|
| | | | 0% | .5% | 2% | 3% | 6% | 8% |
| Control | 0.6 | — | 6 | 12 | 21–31 | 38–41 | 70–84 | 75–116 |
| F | 0.6 | 15 | 6.5 | 9 | 14 | 20 | 20–33 | 23–26 |

EXAMPLE 3

To another batch of a formulation as set forth in Example 1 was added 0.6 ppm copper. The sample was divided with one portion maintained as a control. To another portion was added 15 ppm iron as ferrocene and this composition was designated as composition G. To a third portion was added 16 ppm iron as iron octanoate. Samples were aerated for one hour and 60° gel times determined on dry and added water samples, as shown in Table III. The results demonstrate that ionic iron is less beneficial than ferrocene but does confirm significant improvement in performance at water levels above ~3%.

TABLE III

| | Cu (ppm) | Fe (ppm) | 60° Gel Times (min) % Added Water | | | | | |
|---|---|---|---|---|---|---|---|---|
| | | | 0% | .5% | 2% | 3% | 6% | 8% |
| Control | 0.6 | — | 8 | 15 | 43 | 85 | 165 | 165+ |
| G | 0.6 | 15 | 8 | 11 | 27 | 32 | 33 | 35 |
| H | 0.6 | 16 | 14 | 17 | 47 | 72 | 68 | 58 |

EXAMPLE 4

Another 0.6 ppm copper control formulation was prepared as in the previous examples. A formulation, designated composition I was prepared as in the control except that the copper level was 0.3 ppm and iron was added at a level of 0.6 ppm. The sample was aerated for 24 hours and 60° gel times determined on samples to which 3%, 6% and 8% water had been added. Room temperature gel times were also determined on the samples in capillary tubes. The results in Table IV, demonstrate that the benefits of the invention are present even at levels of iron and copper of less than 1.0 ppm.

TABLE IV

| | Cu (ppm) | Fe (ppm) | % Added Water | | |
|---|---|---|---|---|---|
| | | | 3% | 6% | 8% |
| | | | 60° Gel Times (min) | | |
| Control | 0.6 | — | 82 | 280 | 290 |
| I | 0.3 | 0.6 | 19 | 20 | 40 |
| | | | RT Gel Times | | |
| Control | | | 5 days | 6 days | 6 days |
| I | | | 7 hrs. | 7 hrs. | 7 hrs. |

We claim:

1. In a curable composition comprising an acrylate or methacrylate monomer, a hydroperoxide or perester initiator, and accelerator having —SO$_2$NHCO— functionality and a transition metal co-accelerator, the improvement that the transition metal co-accelerator comprises a source of copper ion at a level of 0.1–10 ppm copper and an iron salt or a ferrocenyl compound at an iron level in excess of the copper level, said iron level being between 0.5 and 60 ppm iron based on total composition weight.

2. The composition of claim 1 wherein the copper level is between 0.4 and 1.0 ppm and the iron level is between 10 and 20 ppm.

3. The composition of claim 1 wherein the ratio of iron to copper is between 2:1 and 30:1.

4. The composition of claim 1 further characterized by the presence of at least 0.5% by weight of water.

5. The composition of claim 1 wherein the iron compound is ferrocene.

6. The composition of claim 1 further comprising a stabilizer.

7. The composition of claim 6 further comprising a surfactant.

8. A composition as in claim 7 wherein the iron level is about 15 ppm and the copper level is about 0.6 ppm.

9. In a process for impregnating an article with an anaerobically curable sealant, the process characterized by a suceptability to contamination of the sealant with water, the improvement comprising that the sealant is a composition as in claim 1.

10. The process of claim 9 wherein the article to be impregnated is a composite of fiber reinforced thermoset resin.

11. The process of claim 9 wherein the copper level is 0.4–1.0 ppm and the iron level is 10–20 ppm.

12. The process of claim 9 wherein the iron compound is ferrocene.

13. The process of claim 11 wherein the iron compound is ferrocene and the composition further comprises a free radical stabilizer and a surfactant.

14. The process of claim 9 wherein the ratio of iron to copper is between 2:1 and 30:1.

* * * * *